Feb. 22, 1955     A. J. KINDIG     2,702,868
CONVEYER ROLL ASSEMBLY
Filed March 15, 1954
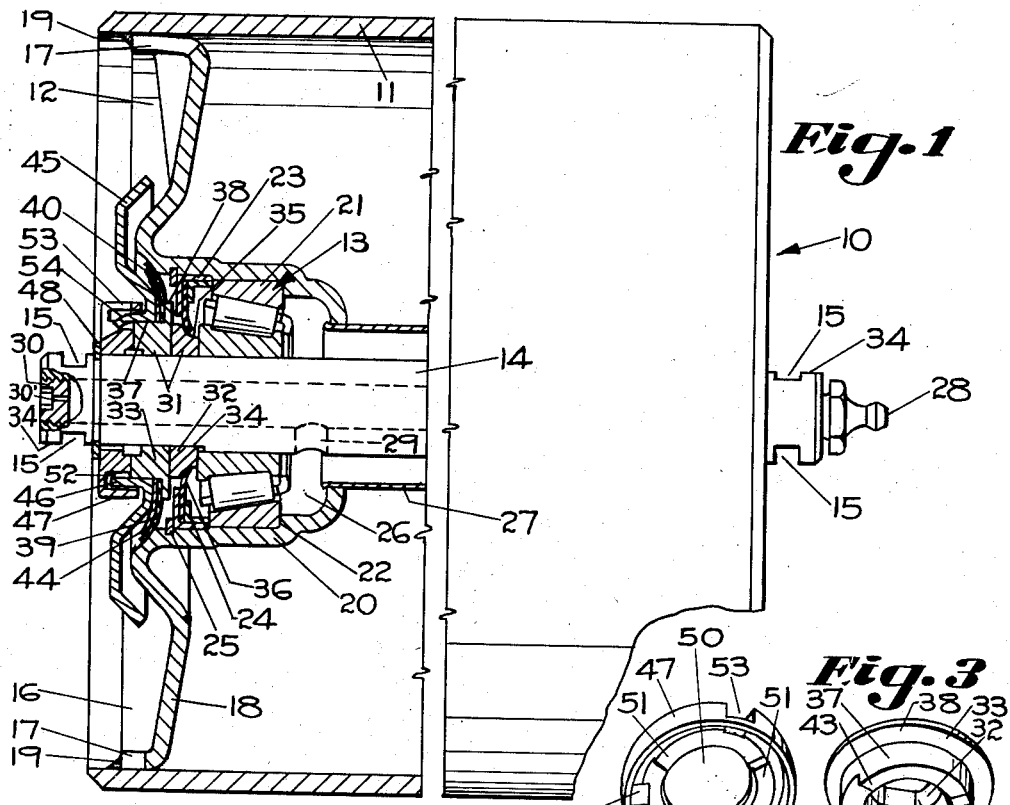
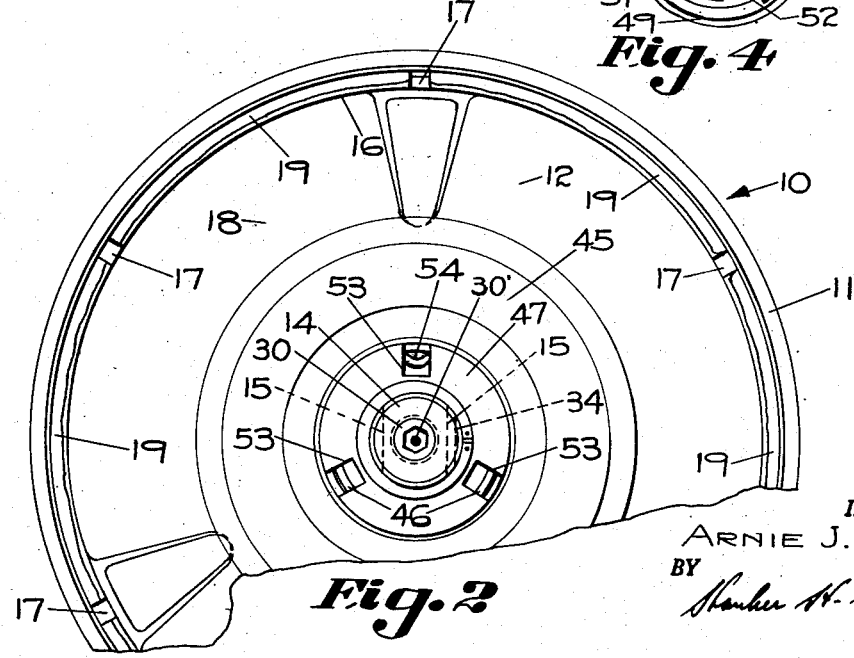
INVENTOR;
ARNIE J. KINDIG,
BY
ATT'Y.

United States Patent Office 2,702,868
Patented Feb. 22, 1955

2,702,868

CONVEYER ROLL ASSEMBLY

Arnie J. Kindig, Columbus, Ohio, assignor to The Jeffrey Manufacturing Company, a corporation of Ohio Application March 15, 1954, Serial No. 416,061

7 Claims. (Cl. 308—20)

This invention relates to conveyer roller assemblies and more specifically to that class thereof in which a roll element is mounted to rotate with respect to its mounting shaft.

One object of the invention is to provide improved construction in a conveyer roller assembly of the type set forth.

Another object of the invention is to provide an improved roller assembly of the type set forth, which may be, for example, a conveyer idler roller adapted to support an endless belt or the like of a conveyer, in which there is improved means for adjusting the bearing or bearings of the assembly.

Another object of the invention is to provide an improved conveyer roller assembly of the type set forth in which there is improved means for adjusting the bearing or bearings of the assembly and protecting said bearing or bearings from damage by reason of the ingress of foreign materials into them and preferably, but not necessarily, the egress of lubricant from them.

Still another object of the invention is to provide an improved conveyer roller assembly of the type set forth above in which there is improved means for adjusting the bearing or bearings of the assembly which means includes elements movable with respect to each other to accomplish said adjustment and which elements are interlocked, when the bearing means is adjusted, by means that may be deformed, bent, pressed or otherwise shaped, to interlock the movable elements.

Other objects of the invention will appear hereinafter, the novel features and combinations being set forth in the appended claims.

In the accompanying drawings:

Fig. 1 is an elevational and sectional view, with a portion broken away, showing an idler roller assembly of a belt conveyer including the features of my invention;

Fig. 2 is an end view of the roller assembly seen in Fig. 1, with a portion thereof broken away;

Fig. 3 is a view in perspective of one of the elements of one of the adjusting mechanisms for a bearing means of the assembly seen in Fig. 1 of the drawings; and Fig. 4 is a view in perspective of another of the elements of one of the adjusting mechanisms, the elements of Figs. 3 and 4 being adapted to cooperate as seen in Fig. 1.

The conveyer idler roller assembly 10 shown in the drawings, that is, the structure at one of its ends is identical to the structure at the other and for this reason the roller assembly 10 is shown partly in section and partly in elevation in Fig. 1 of the drawings.

The roller assembly 10 includes a roll element 11 formed of a tubular shell closed at each of its ends by an end disk 12. Roll element 11 is carried at each of its opposite ends through one of the end disks 12 and an antifriction roller bearing 13 mounted upon a hollow dead shaft 14 that extends longitudinally or axially through the roll element 11 and projects at its ends through the bearings 13. Shaft 14 is notched or slotted at 15 adjacent each of its ends and on opposite sides thereof to provide ways or grooves by which the ends of shaft 14 may be fitted in and fixed against rotation in a pair of spaced supporting brackets, not shown.

The end disks 12 are stamped from sheet metal and each is formed to include a peripheral laterally extending flange 16 interrupted by a plurality of slots or notches 17 in order that the radially outermost portions of the disk 12 which lie between the slots or notches 17 may have a degree of resiliency or compressibility thereby to permit the disk 12 to be pressed into an open end of the shell 11 somewhat in the manner of a milk bottle cap. Each disk 12, after being pressed into the shell 11, is made integral with the shell by being welded thereto as indicated at 19. Each disk 12 is also formed to include an integral cup 20 that extends laterally from the body 18 of disk 12 into the shell 11 and is symmetrical with respect to the axis of rotation of the shell 11 and the axis of dead shaft 14.

The construction of the shell 11 and end bell 12 are more fully described and claimed in my co-pending application, Serial No. 416,062, filed simultaneously herewith for a Conveyer Roll Shell Assembly and Method of Making It.

The outer race 21 of bearing 13 is pressed axially into the cup 20 of shell 11 and axial movement of this bearing race is prevented by a shoulder 22 on the cup 20 and a retaining ring 23 of an inner grease seal means 24, which retaining ring is held within the cup 20 by a snap ring 25.

It may be pointed out here that each cup 20 of the roll or shell 11 provides a lubricant chamber 26 for the bearing 13 contained therein. The cups 20 at the opposite ends of the roll or shell assembly are interconnected by a tube or inner shell element 27 through which the dead shaft 14 extends axially. Lubricant, preferably in the form of grease, is fed to the chambers 26 and bearing 13 through a grease fitting 28 threaded into one end of the hollow shaft 14, the hollow interior of said shaft and a pair of radial bores in the shaft, one of which is indicated at 29 in Fig. 1 of the drawings. The end of shaft 14 opposite grease fitting 28 is closed by a threaded plug 30. Plug 30 includes a small bore 30' through which any air entrapped in the grease chambers and passageways may escape during the operation of greasing the bearings. The diameter of bore 30' is such that when grease begins to pass from it in a steady flow there will be sufficient pressure on the grease within the grease chambers and passageways in the roll assembly to cause grease therein to flow properly into the bearings and lubricate them. The positions of the plug 30 and the grease fitting 28 on shaft 14 may be reversed. If desired, shaft 14 may be a solid shaft and when such is the case the chambers 26 in cups 20 and the bearings may be filled with grease when the roll is assembled.

The idler roller assembly 10 has identical mechanisms for adjusting the bearing 13 and each of these mechanisms includes an inner generally cylindrical die cast sleeve or collar means 31 formed of an inner ring or spacer element 32 and an outer ring element 33. The sleeve or collar means 31 is preferably built up of the two separate die cast elements 32 and 33 in order that the ring or spacer element 32 only need be changed to accommodate the adjusting mechanism to different bearings having axial thicknesses differing from that of the bearing 13 shown in the drawings. It is to be understood, however, that, if desired, the inner sleeve or collar element 31 may be made as one element including the structural features of both of the elements 32 and 33, and that the claims appended hereto so treat it.

The inner ring or spacer element 32 is, in effect, a washer, the central bore or opening 41 of which includes a flat 42 (see Fig. 3) adapted to cooperate with a flat 34 formed on one side of the shaft 14 that extends axially from one of its ends. The central opening 41 of spacer element 32 fits closely upon the end portion of the shaft 14 and its flat 42 cooperates with the flat 34 on shaft 14 to hold the spacer 32 from rotating upon the shaft 14 while providing for movement of the spacer 32 axially along the shaft 14. This axial movement of the spacer 32 along the shaft 14 is necessary in order to adjust the bearing 13.

The inner ring or spacer element 32 is also an element of the inner grease seal means 24 and it includes a peripheral concave wiping surface 35 that cooperates with a flexible seal or diaphragm element 36 of the seal means 24 to prevent the egress or loss of lubricant from the chamber 26.

The ring element 33 includes an outer cylindrical portion 37 having a disk-like flange 38 which provides a shoulder or abutment against which a flexible seal or diaphragm element 39 of an outer seal means 40 is retained. The ring element 33 includes the above described central bore 41 having flat 42 (see Fig. 3). The central bore 41 of ring element 33 fits closely upon the end of shaft 14 with the flat 42 thereof cooperating with the flat 34 on shaft 14 to hold the ring element 33 from rotating on the shaft 14. It will be seen that the elements 32 and 33 are interlocked through the flat 34 of shaft 14 which extends axially through them. The inner side of ring element 33 is flat and this side of it abuts the outer side of the inner or spacer ring element 32. The opposite or outer side of element 33 includes three cams or cam surfaces 43, the function of which is apparent from the description that follows.

The flexible seal or diaphragm 39 and a circular finger spring 44 of the outer seal means 40 are secured, with said diaphragm 39 abutting the flange 38, by a dished protecting shield, ring or cover 45.

The shield or cover 45 is a ring stamped from sheet metal and it includes a central opening surrounded by an integral circular flange or lip 46 of such dimensions that it has a press fit with the cylindrical portion 37 of element 33 and whereby it projects axially beyond the cams 43 thereof. A peripheral portion of the flexible seal or diaphragm 39 coacts with a concave wiping surface formed about the mouth of the cup 20 and the finger spring 44 urges the flexible seal 39 into contact with said surface. One function of the outer seal means 40 is to prevent the ingress or entry of foreign matter into the bearing. The seal means is guarded by the protecting cover 45. It may be mentioned here that the bearing seal including the inner and outer seal elements 24 and 40 are described and claimed in my co-pending application, Serial No. 280,277, filed April 3, 1952, for a Grease Seal, and that the present seal has the identical functions therein set forth.

The inner collar or sleeve means 31 including the ring elements 32 and 33 is moved axially along the shaft, to adjust the bearing 13, by an outer die cast collar or sleeve 47 mounted for rotation on the shaft 14 and retained thereon against axial movement in one direction by a snap ring 48 which forms a removable abutment or shoulder on the shaft 14 at one side of the collar or sleeve 47. Collar or sleeve 47 is a cylindrical cup including an outer cylindrical flange 49 and a central cylindrical opening 50 which is surrounded by three cams or cam surfaces 51 in end to end relation. Cams 51 of collar or sleeve 47 cooperate with the cams 43 on the ring 33 of collar means 31 to adjust the latter when the collar or sleeve 47 is rotated.

Collar or sleeve 47 is cast to include a cylindrical groove or channel 52 that lies radially outwardly of the cams 51 thereof and inwardly of the flange 49. Collar 47 includes three notches, grooves or slots 53 that extend radially inwardly through the flange 49 and into the main body portion of the collar. These slots 53 have the dual function of providing notches or slots in the flange 49 by which a spanner wrench may be attached to the collar 47 to rotate it with respect to the shaft 14 and collar 31 thereby to adjust the position of the collar means 31, through the cams 43 and 51, along the shaft 14 and consequently the inner race or cone of bearing 13. The notches, grooves or slots 53 also provide means on the collar 47 which cooperate with the lip 46 on the collar 31 to interlock the collars or sleeves 47 and 31 when the bearing is properly adjusted. As set forth above, the lip 46 formed on the protecting cover 45 extends or projects axially from the element 33 beyond the cam elements 43 thereof and it also extends into the groove or channel 52 of the outer collar or sleeve 47. By inserting a punch or the like into the slots 53, the lip 46 may be deformed or bent, as indicated at 54, radially inwardly at least at one of the notches or slots 53 and into the latter thereby interlocking the collar or sleeve elements 31 and 47. If desired, lip 46 may be made as an integral part of ring 33.

Should it be desired to readjust the bearing after the lip 46 has once been set, as above described, the collar element may be force rotated on shaft 14 by a spanner tool, or the like, and such rotation of it will cause the sides of the slots 53 to force the bent or deformed portions 54 of lip 46 outwardly thereby removing the interlock between the collars or sleeves 47 and 31. After the bearing is readjusted by rotating the outer collar or sleeve 47, the lip 46 may, of course, again be bent or deformed at one or more of the slots 53 as above described, to interlock the collars or sleeves 47 and 31.

From the foregoing it will be seen that the inner sleeve means 31 of the adjusting mechanism is mounted upon the shaft 14 and is held thereon against rotation by the flats in the central opening of each of its ring elements 32 and 33 which flats cooperate with the flat 34 of shaft 14. It will also be seen that the rings 32 and 33 are interlocked by the cooperating flats and the shaft 14 and that when the outer collar or sleeve 47 is rotated the cam elements 43 and 51 cooperate to adjust the inner sleeve 31 and consequently the inner race of bearing 13 axially along the shaft 14. It will be seen further that the collars or sleeves 47 and 31 may be interlocked readily by the mere deformation of the lip 46 on the inner collar or sleeve 31 into one or more of the notches, grooves or slots 53 of the collar or sleeve 47 whereby the deformed portion or portions of the lip 46 and the notches, grooves or slots 53 cooperate to interlock the collars or sleeves 47 and 31.

Preferably, although not necessarily, the roll assembly includes two of the adjusting mechanisms above described, one adjacent each bearing at each end thereof, in order that the total amount of axial adjustment for the bearings is the product of both of the adjusting mechanisms. This is desirable since when two such bearing adjusting mechanisms are employed, the pitch or slope of the cams 43 and 51 of the adjusting mechanisms may be at relatively low angles which, of course, reduces the tendency of the adjusting mechanisms to loosen or "back off" during operation of the roller assembly, this, of course, reduces strains on the cooperating interlocking elements of the adjusting mechanisms as well as providing for easier adjustment of the bearings.

Roll assemblies made in accordance with this invention are particularly adapted to mass production because the individual elements of each of the assemblies are made by stamping, die casting and simple machining operations.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

1. A conveyer roller assembly including a roll, a shaft extending longitudinally through said roll, antifriction bearing means mounting each end of said roll on said shaft, means for adjusting each of said antifriction bearing means and sealing one of its sides against the ingress of foreign matter and the loss of lubricant, each of said adjusting means including collar means on said shaft at one side of said bearing including a cam surface, a second collar means on said shaft at one side of said first collar means including a cam surface adapted to cooperate with said cam surface on said first collar means for adjusting said first collar means axially along said shaft when one of said collar means is rotated with respect to the other, means for preventing axial movement of said second collar means along said shaft in one direction, means for interlocking said first and second collar means thereby to prevent relative rotation between them, a pair of seal means interposed between said roll and said first collar means, and a disc carried by said first collar at one end of said roll protecting said seal means.

2. A conveyer roller assembly including a roll, a shaft extending longitudinally through said roll, antifriction bearing means mounting each end of said roll on said shaft, means for adjusting each of said antifriction bearing means and sealing one of its sides against the ingress of foreign matter, each of said adjusting means including collar means on said shaft at one side of said bearing including a cam surface, a second collar means on said shaft at one side of said first collar means including a cam surface adapted to cooperate with said cam surface on said first collar means for adjusting said first collar means axially along said shaft when one of said collar means is rotated with respect to the other, means for preventing axial movement of said second collar means along said shaft in one direction, means for interlocking said first and second collar means thereby to prevent relative rotation between them, seal means interposed between said roll and said first collar means, and a disc carried by said first collar at one end of said roll protecting said seal means.

3. A conveyer roller assembly including a roll, a shaft, antifriction bearing means mounting each end of said roll on said shaft, means for adjusting said antifriction bearing means including collar means on said shaft at one side of one of said bearing means including a cam surface, a second collar means on said shaft at one side of said first collar means including a cam surface adapted to cooperate with said cam surface on said first collar means for adjusting said first collar means axially along said shaft when one of said collar means is rotated with respect to the other, means for preventing axial movement of said second collar means along said shaft in one direction, and means for interlocking said first and second collar means thereby to prevent relative rotation between them.

4. A conveyer roller assembly including a roll, a shaft, bearing means mounting each end of said roll on said shaft, means for adjusting said bearing means including collar means on said shaft at one side of one of said bearing means including a cam surface, a second collar means on said shaft at one side of said first collar means including a cam surface adapted to cooperate with said cam surface on said first collar means for adjusting said first collar means axially along said shaft when one of said collar means is rotated with respect to the other, means for preventing axial movement of said second collar means along said shaft in one direction, and means for locking said first and second collar means against relative rotation.

5. A conveyer roller assembly including a roll, a shaft, bearing means mounting said roll on said shaft, mechanism for adjusting said bearing means including sleeve means on said shaft at one side of said bearing means including a cam means, means preventing rotary movement of said sleeve means on said shaft while permitting axial movement of it along said shaft, a collar means on said shaft including a cam means adapted to cooperate with the cam means of said sleeve means to adjust the latter axially with respect to said shaft, means forming a recess in said collar means, and means carried by said sleeve means adapted to interlock said sleeve and collar by being pressed into said recess.

6. A conveyer roller assembly including a roll, a shaft, bearing means mounting said roll on said shaft, mechanism for adjusting said bearing means including sleeve means on said shaft at one side of said bearing means including a cam means, means preventing rotary movement of said sleeve means on said shaft while permitting axial movement of it along said shaft, a protecting shield carried by said sleeve means providing a peripheral cylindrical lip at one side of said sleeve, collar means on said shaft including a cam means adapted to cooperate with the cam means on said sleeve means to adjust the latter axially with respect to said shaft, and means forming a recess in said collar means into which said lip may be pressed to interlock said collar and sleeve means.

7. A conveyer roller assembly including a roll, a shaft, bearing means mounting said roll on said shaft, mechanism for adjusting said bearing means including sleeve means on said shaft at one side of said bearing means including a cam means, means preventing rotary movement of said sleeve means on said shaft while permitting axial movement of it along said shaft, a protecting shield carried by said sleeve means providing a lip, rotary means surrounding said shaft, and means forming a recess in said rotary means into which said lip may be pressed to interlock said sleeve means and said rotary means.

References Cited in the file of this patent

UNITED STATES PATENTS

| | | |
|---|---|---|
| 1,365,429 | Wickersham | Jan. 11, 1921 |
| 1,438,570 | Zimmerman | Dec. 12, 1922 |
| 1,746,978 | Winkler | Feb. 11, 1930 |
| 1,778,060 | Briggs | Oct. 14, 1930 |
| 2,115,916 | Weckstein | Apr. 25, 1939 |

FOREIGN PATENTS

| | | |
|---|---|---|
| 452,793 | Germany | Nov. 18, 1927 |
| 453,449 | Germany | Dec. 6, 1927 |